Oct. 6, 1931. E. W. WHEELER 1,826,194
JAR LIFTER
Filed Aug. 11, 1930
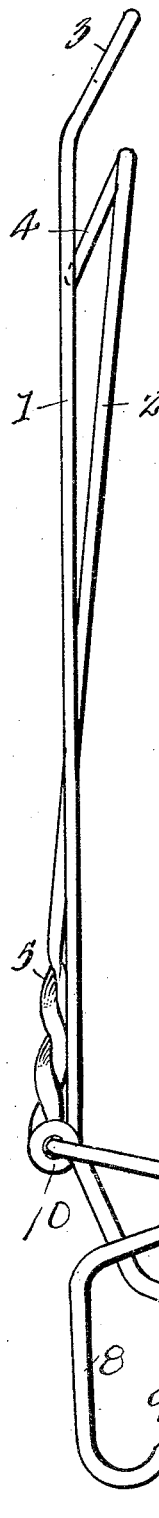
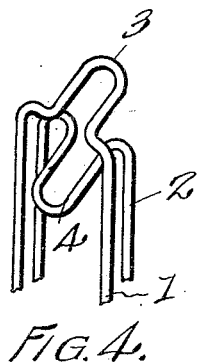
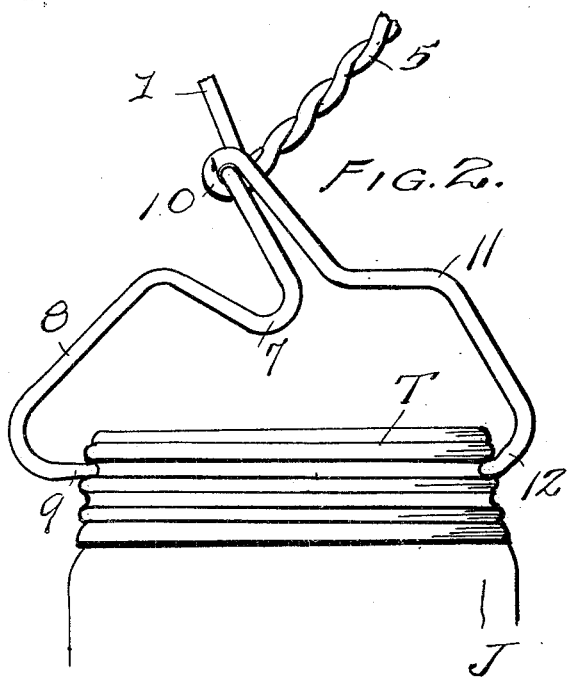
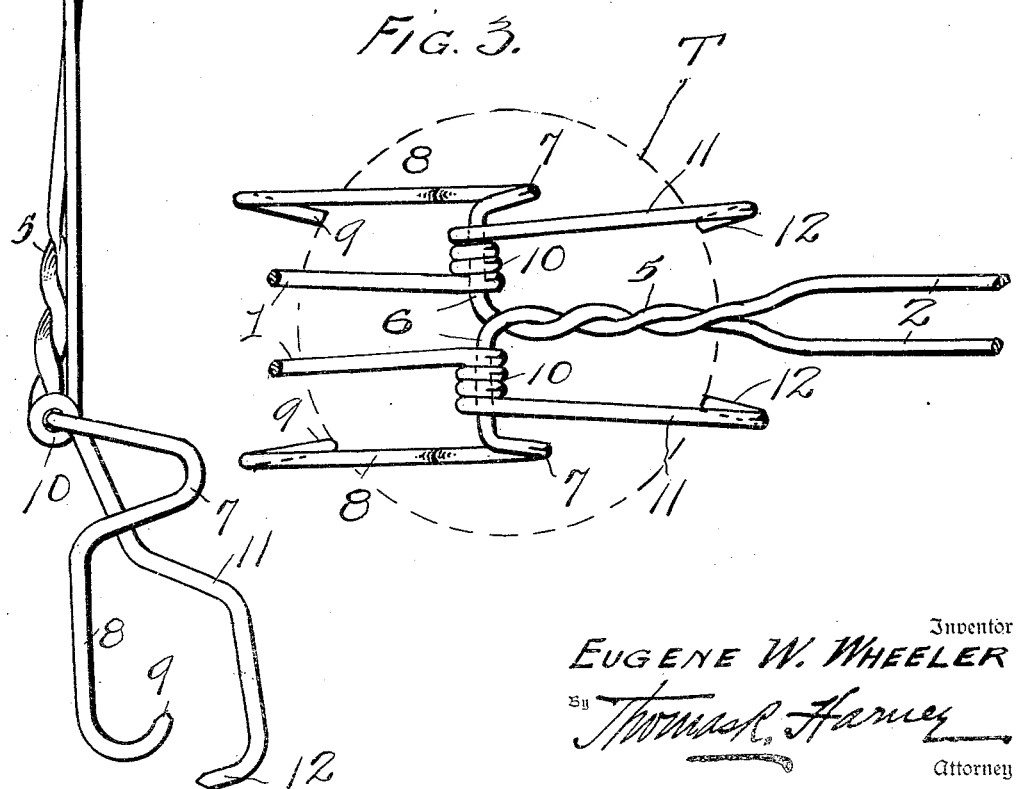
Inventor
EUGENE W. WHEELER
By Thomas R. Harney
Attorney Patented Oct. 6, 1931

1,826,194

UNITED STATES PATENT OFFICE

EUGENE W. WHEELER, OF SALEM, OREGON

JAR LIFTER

Application filed August 11, 1930. Serial No. 474,471.

My present invention relates to improvements in jar lifters of the pivoted handle type, and designed for general use as a kitchen utensil. While the device of my invention is particularly useful in lifting preserve jars from hot water receptacles and for depositing the jars in desired places, it will be understood that by manufacturing the lifter or utensil in various sizes, the device is adapted for bodily lifting other articles, and for carrying them if desired.

In carrying out my invention the utensil is fashioned from two pieces of wire of suitable size, and the wires are bent to shape in suitable machines or by the use of suitable tools, for the purpose of providing a light but strong lifter that may be manipulated with facility. The pivoted or crossed handles are provided with co-acting jaws, and the handle-ends opposite to the jaws are fashioned with a loop for hanging up the utensil when it is out of use, and these loops on the handle ends may also be used as scrapers if desired.

Due to its simplicity in construction, and the minimum number of parts, the utensil may be manufactured at a comparatively low cost of production, and because of the pivotal arrangement of the two handles, the utensil with a load therein may be carried in one hand, or by the use of two hands as desired.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have so far devised for the practical application of the principles of my invention.

Figure 1 is a side view of the utensil in closed position, as when hung up or suspended from a nail or hook, and out of use.

Figure 2 is a side view of the jar lifter applied to a jar top in position for use, and with the handles broken away for convenience of illustration.

Figure 3 is a top plan view of the device of Figure 2, with the jar top indicated by a dotted circle.

Figure 4 is a perspective view at the handle end of the lifter, with the device in closed position, as when hung up out of use.

In carrying out my invention I employ two pieces of wire of suitable size, and each of these wires is bent to form a looped handle, as 1 and 2, the end of the handle 1 being fashioned with a small projecting loop 3 that extends beyond the handle 2 in order that the loop 3 may be utilized for hanging up or suspending the utensil from a nail or hook. The handle 2 is fashioned with an inwardly projecting loop 4, and this loop, as well as the loop 3, may be used for scraping pans, and for performing other similar functions when the utensil is not used as a jar lifter.

The utility of the device is illustrated in Figures 2 and 3 where a usual type of preserve jar is indicated at J and provided with the usual metal screw top T, and the screw top is used for receiving the jaws or hooks of the lifter.

The two bars of the handle 2 are brought together and twisted as at 5, and then the wires are extended outwardly, in opposite directions from the twist to form trunnions 6. These trunnions are bent into side loops 7, 7, of U-shape, and the loops 7 merge into jaws 8 that terminate in hooks 9.

The two bars of the handle 1 are fastened with bearing coils 10 surrounding the two trunnions 6, and as shown the coils are disposed at opposite sides of the twist to form a wide pivot bearing on the trunnions 6 to insure stability of the device when in use. The twist 5 and the coils 10 reinforce and brace the utensil at the pivotal point of the jaws and handles, and the U-shaped loops 7 at the sides of the coils also strengthen the utensil, and in some instances these loops are used as fulcrums for leverage when the loops rest upon the top of the article to be lifted.

At their outer ends, the coils are fashioned as offset arms 11, and these arms terminate in hooks 12, which hooks co-act with the hooks 9 in clamping the jar top as shown.

The arms 11 are spaced nearer together than the arms 8 in order that these inner arms 11 may fold within the space between the U-shaped loops of the arms 8 when the utensil is folded to compact form and out of use. As seen in Figure 3 the four jaws or hooks 9, 9, and 12, 12 are relatively spaced apart when the jaws are spread open, and symmetrically arranged, in order that the jar top or other article may be grasped at four points and thereby be securely held when the jar is lifted by hand or hands grasping the handles.

The utensil is manipulated similar to a pair of tongs, and because of the pivotal arrangement of the trunnions in the bearing coils, the utensil may be lifted with its load, by one hand grasping one handle, the leverage exerted thereby being sufficient to insure the necessary grip of the jaws or hooks on the article to be lifted and carried.

It will be apparent that the utensil may be readily applied to other articles and for other uses in addition to the use illustrated in the drawings.

Having thus fully described my invention, what I claim as new and desire to secure by Letters Patent is:—

A jar lifter comprising two pieces of wire each fashioned with a looped handle, one of said handles having a twist and oppositely extended trunnions projected from the twist, U-shaped loops adapted to provide a fulcrum and formed at the outer ends of the trunnions, outer side arms extended from said loops and jaws on the ends of said arms, the other handle having spaced bearing coils surrounding the trunnions, inner side arms projected from the coils, and hooks on said inner side arms extending toward the first pair of hooks.

In testimony whereof I have affixed my signature.

EUGENE W. WHEELER.